Patented Feb. 5, 1935

1,990,292

UNITED STATES PATENT OFFICE 1,990,292

PROCESS FOR FIREPROOFING CELLULOSIC MATERIALS

Martin Leatherman, Hyattsville, Md.; dedicated to the free use of the public

No Drawing. Application January 16, 1933, Serial No. 652,032

7 Claims. (Cl. 91—68)

(Granted under the act of March 3, 1883, as amended April 30, 1928; 370 O. G. 757)

This application is made under the act of March 3, 1883, as amended by the act of April 30, 1928 and the invention herein described, if patented, may be manufactured and used by or for the Government for governmental purposes without the payment to me of any royalty thereon.

I hereby dedicate the invention herein described to the free use of the public in the territory of the United States of America to take effect upon the granting of a patent to me.

This invention relates to an improvement in the fire-proofing of cellulosic materials which also lessens deterioration of cellulose fabrics by sunlight and weather.

It is well established that hydrated stannic oxide prevents flaming of cellulosic materials when properly placed therein. The prior art has involved impregnating the fabric or other cellulose material with a solution of sodium stannate of suitable concentration and then immersing the impregnated material in a solution of ammonium sulfate whereby a metathetical reaction results in the deposition of hydrated stannic oxide in the cellulose fibre and the formation of sodium sulfate and free ammonia. All soluble products of the reaction are washed out of the fibers so that the only purpose served by the ammonium sulfate is the liberation of the stannic oxide. However, the presence of ammonia causes the stannic oxide to be deposited under alkaline conditions, which are undesirable.

I have discovered that the flame-proofing efficiency of the stannic oxide can be greatly increased by certain changes in the method of precipitation. If, instead of an ammonium salt, I use a salt of a strong acid with a weakly base-forming metal, the hydroxide of which is water insoluble, I achieve better results for two reasons. In the first place, the insoluble hydroxide has no undesirable alkaline reaction with the result that less alkali is adsorbed and absorbed by the stannic oxide. In the second place the insoluble metal hydroxide is deposited in the cellulose fibers with the stannic oxide. I have discovered that many hydrated metal oxides, other than stannic oxide, such as manganese dioxide, cupric oxide and ferric oxide, have very marked flame-proofing properties either alone or in connection with stannic oxide, so that the presence of any or of several of these metallic oxides in the fabric is of great value. Furthermore, some of these metallic oxides have pigmenting properties which are desirable for reasons that will be explained below.

I might achieve the precipitation of stannic oxide reasonably free of alkali by using a dilute acid solution, a solution of ammonium salt acidified with added acid or by use of a solution of an acid salt such as sodium bisulphate. However, for reasons as stated I prefer to precipitate the hydrated stannic oxide by interaction of the sodium stannate, previously dried within the cellulose material, with solutions of any one of various metallic salts or of mixtures of these salts. The chief requirements are that the metallic salts be sufficiently hydrolyzed in aqueous solution to yield a solution of decidedly acid reaction, and that the hydroxide of the metal be insoluble. The acidic nature of these salt solutions serves to precipitate the stannic oxide from the sodium stannate freer from adsorbed alkali, while at the same time the basic nature of the sodium stannate solution serves to precipitate the hydrated oxides of any of the metals present in the salt solutions. In many cases the hydrolytic effect can be further assisted by adding additional acid to the salt solution, care being taken not to add enough acid to redissolve the precipitated oxides. As examples of metallic salts which may be used I will mention alums containing chromium or iron and mixtures of such alums, ferric and chromium salts other than alums, salts of copper, titanium, nickel, cadmium, zinc, aluminum, thorium, cerium, vanadium, lanthanum, zirconium, stannic and stannous tin, etc. There are obviously other salts which may be used, but these suffice to indicate the method. I have found it desirable to mix certain salts for various reasons. Ordinarily the total salt content of the precipitating salt solution will not exceed 20% by weight.

As an example a 7 to 10% aqueous solution of thorium and cerium nitrates in the proportion to give a ratio of 99 parts of thorium oxide and 1 part cerium oxide when precipitated may be used.

Also there may be used a 20% aqueous solution of crystallized ferric sulphate.

Or there may be used a 5 to 10% aqueous acidified solution of a vanadyl salt, the acid used to acidify being that corresponding to the salt used.

I may or may not find it advantageous to use acid in the salt solutions utilized, dependent on the degree of alkalinity of the sodium stannate, since it is desirable to neutralize the alkali in the sodium stannate because the presence of alkali seems to decrease the fire-proofing effect of the precipitated oxides.

My general method of procedure is to saturate the fibrous material with a solution of sodium stannate of as dilute concentration as is consistent with the desired result, namely, a sufficient degree of flame-proofness; and then to dry the cellulose material with the sodium stannate being thereby deposited on the fibers. By a solution of sodium stannate is to be understood a solution of a compound of the general formula $Na_2SnO_3$ kept dispersed in the aqueous medium by a certain minimum concentration of sodium hydroxide to which may be added any desired excess of alkali, but I do not wish to be restricted in any way by this definition. It is obvious that the sodium can be replaced by any of the other alkali metals such as potassium. The dried fabric is immersed for a short time in the desired metallic salt solution whereby a mutual precipitation is effected. The alkali in the sodium stannate is neutralized by the acid radical of the metallic salt by the mechanism of base exchange. Simultaneously, hydrated stannic oxide and the hydroxide of the metal in the salt are deposited in the cellulose material.

Since metallic oxides prevent propagation of flame by or in cellulose materials but do not prevent vigorous flameless combustion or after-glow, it is necessary to supplement the action of the metallic oxides with some other material to prevent flameless combustion. It has been found that certain types of chlorinated organic compounds are excellent for this purpose. Chlorinated vinyl resins have been used and I have discovered that chlorinated rubber is likewise satisfactory. There are, no doubt, other suitable materials. However, these substances are all objectionable for the reason stated in the next paragraph.

It is known that stannic oxide is capable of causing marked deterioration of cellulose material under the influence of certain light rays. It has likewise been observed that the various chlorinated organic materials used for glow-proofing the cellulose also cause rapid deterioration of cellulose under the effect of certain kinds of light rays. I have discovered that the deteriorating effect of stannic oxide and that of the chlorinated organic substances can be very greatly lessened by use of a pigmenting or coloring material other than white on the cellulose fiber. It has not been clearly established as to the processes, taking place during the said deterioration, but it is evident that these processes are, if not initiated, at least accelerated by certain light rays impinging upon the impregnating material in contact with the fibers. It may be assumed that the pigmenting material either absorbs the activating light rays or otherwise prevents their action. I may use as the pigmenting material colored metallic hydrated oxides such as those of iron, chromium, copper, cobalt, nickel, manganese, etc., mutually precipitated with stannic oxide as already shown, or I may prefer to use an additional pigment placed in or on the cellulose material as the final step in the treating process either by impregnation by precipitation in the cellulose material or placed and held thereon by means of a binding material which may or may not be also a water-proofing agent, or which may be the glow-proofing resinous material itself. As examples I may use earthy pigments such as raw or burnt umber, raw or burnt sienna, ochre, chrome green, chrome yellow, prussian blue, metallic aluminum, etc. I may also use organic dyes where they are found to have a protective action. In practice the pigment may be impregnated into or deposited upon the cellulose material either before or after the chlorinated material has been deposited thereon.

The glow-proofing material may also serve as the binding agent. A pigment may be applied with a binding agent after all other treatments have been completed.

Having fully disclosed my discovery I claim as my invention:

1. The process of fire-proofing and preserving cellulosic materials and fabrics which comprises impregnating the cellulosic material with sodium stannate, drying, and then immersing the dried cellulosic material in a water solution of a salt of strong mineral acid with a weakly base-forming metal, the hydroxide of which is water insoluble, then washing the cellulose material in water to remove the acid residues, drying the cellulosic material, impregnating the material with chlorinated rubber and incorporating in the resulting cellulous fabric, coloring materials.

2. The process of fire-proofing and preserving cellulosic materials and fabrics which comprises impregnating the cellulosic material with sodium stannate, drying, and then immersing the dried cellulose material in an aqueous solution of a titanium salt in which the titanium displays its metallic or base-forming tendency, said aqueous solution being acidified with added acid, then washing the cellulose material in water to remove the acid residues, drying the cellulosic material, impregnating the cellulosic material with a solution of chlorinated rubber containing a suspension of ferric oxide.

3. The process of fire-proofing and preserving cellulosic materials and fabrics which comprises impregnating the cellulosic material with sodium stannate, drying, and then immersing the dried cellulose material in an aqueous solution of crystallized ferric sulphate slightly further acidified with sulphuric acid, then washing the cellulose material in water to remove the acid residues, drying the cellulosic material, impregnating the cellulosic material with a solution of chlorinated rubber.

4. The process of fire-proofing and preserving cellulosic materials and fabrics which comprises impregnating the cellulosic material with sodium stannate, drying, and then immersing the dried cellulose material in an aqueous acidified solution of a vanadyl salt, then washing the cellulose material in water to remove the acid residues, drying the cellulosic material, impregnating the cellulosic material with a solution of chlorinated rubber containing a suspension of ferric oxide.

5. The process of fire-proofing and preserving cellulosic materials and fabrics which comprises impregnating the cellulosic material with sodium stannate, drying, and then immersing the dried cellulosic material in a water solution of at least one of the substances selected from the group consisting of salts of iron, chromium, copper, titanium, nickel, cadmium, zinc, aluminum, vanadium, stannic and stannous tin, then washing the cellulosic material in water to remove the acid residues, drying the cellulosic material, impregnating the material with chlorinated rubber and incorporating in the resulting cellulous fabrics, coloring materials.

6. A flame and glow-proofed cellulosic material comprising the product resulting from impregnating the cellulosic materials with sodium stannate, drying, and then immersing the dried cellulosic material in a water solution of a salt of a strong mineral acid with a weakly base-forming metal, the hydroxide of which is water insoluble, then washing the cellulose material in water to remove the acid residues, drying the cellulosic material, impregnating the material with chlorinated rubber and incorporating in the resulting cellulous fabrics coloring materials.

7. A flame and glow-proofed cellulosic material comprising the product resulting from impregnating the cellulosic material with sodium stannate, drying, and then immersing the dried cellulosic material in a water solution of at least one of the substances selected from the group consisting of salts of iron, chromium, copper, titanium, nickel, cadmium, zinc, aluminum, vanadium, stannic and stannous tin, then washing the cellulose material in water to remove the acid residues, drying the cellulosic material, impregnating the material with chlorinated rubber and incorporating in the resulting cellulous fabrics, coloring materials.

MARTIN LEATHERMAN.